R. C. NEWHOUSE.
PROCESS OF AND APPARATUS FOR PRODUCING CARBON DIOXID GAS.
APPLICATION FILED JUNE 27, 1919.

1,332,138. Patented Feb. 24, 1920.

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

PROCESS OF AND APPARATUS FOR PRODUCING CARBON-DIOXID GAS.

1,332,138.  Specification of Letters Patent.  Patented Feb. 24, 1920.

Application filed June 27, 1919. Serial No. 307,804.

*To all whom it may concern:*

Be it known that I, RAY C. NEWHOUSE, a citizen of the United States, residing at Wauwatosa, in the county of Milwaukee and State of Wisconsin, have invented a certain new and useful Improved Process of and Apparatus for Producing Carbon-Dioxid Gas, of which the following is a specification.

This invention relates to an improved process of an apparatus for producing or recovering carbon dioxid gas for commercial purposes.

An object of the invention is to provide a process of producing carbon dioxid gas, which is simple and efficient. Another object is to provide simple and efficient apparatus for carrying out the process.

It has heretofore been customary to utilize for commercial purposes, the gases delivered from kilns such as are ordinarily employed to produce lime by calcining calcium carbonate by the heat of coal, coke or other similar carbonaceous fuel. Carbon dioxid gas is a main constituent of the gases of ordinary lime kilns. This results, first, from the dissociation of the carbon dioxid gas from the carbonates of calcium and magnesium, and second, from the combustion of the carbon in the fuel. As it is necessary to utilize a relatively large amount of air to support combustion in the calcining zone, the gases delivered from the kilns are considerably diluted on account of the nitrogen contained in the air.

The present invention contemplates the provision of a method of and apparatus for producing gases having high carbon dioxid content, while burning lime in a vertical, or a rotary kiln, or in any other type of calcining device. The invention contemplates, first, utilization of water gas as a fuel to produce the heat necessary to calcine a carbonate; second, utilization of the produced carbon dioxid gas by chemically combining carbon therewith to produce carbon monoxid gas which is then burned to subsequently calcine other carbonates; and third, utilization of carbon dioxid gas from any source for the production of carbon monoxid for subsequent use as a fuel for calcining of material.

Air or other oxygen containing material is essential in order to support combustion of the fuel required to produce the heat necessary for calcining. Where a solid such as coke is employed as the fuel, considerable excess air must be used in order to have complete combustion. This excess air dilutes the "stack" gases, that is, the gases delivered from the kiln. Where producer gas is used in the ordinary way, having been preliminarily cooled, there is much loss of heat by radiation in this manner. The lower the amount of nitrogen in the kiln, the higher the percentage of carbon dioxid gas in the stack gases. The amount of air entering the kiln should therefore be kept as low as possible. With gaseous fuel this is more easily possible than with liquid or solid fuel.

A comparison of the chemical and physical changes accompanying the use of different fuels is easily made by a study of the following formulæ:

*Prior art.*

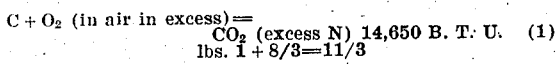

$\mathrm{CaCO_3 + 14{,}650\ B.\ T.\ U. = CaO} + (a)\mathrm{CO_2}$ (2)

*Water gas.*

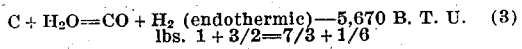

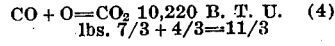

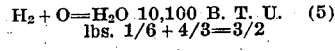

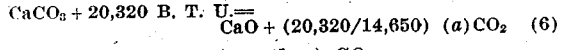

*Stack (or other) $CO_2$ gas.*

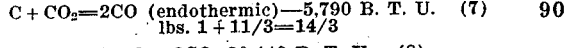

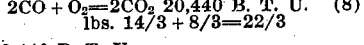

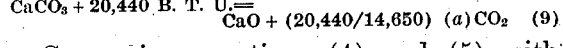

Comparing equations (4) and (5) with equation (1), it will be apparent that by the use of water gas more heat can be furnished the kiln than by burning directly in the kiln carbon of weight equal to that of the carbon in the water gas. Comparison of equation (6) with equation (2) shows more carbon dioxid is produced from the material calcined. It should be borne in mind that because of the excess air required in burning carbon directly in the kiln some of the smaller quantity of heat of combustion is even used up to heat this excess air and thus is not available for calcining purposes. On the other hand, the water gas comes from the producer hot and thus makes available more heat for calcining.

Comparing equations (7), (8) with equations (1), (4), (5), and based on equal weights of carbon in each of the three cases, we find the same amount of air (O) used in all three cases, but more heat is developed in the kiln by the use of stack gases than by either the use of carbon or water gas. More carbon dioxid will therefore be developed in calcining. The stack gases used will be in heated condition the same as is the case in the use of water gas. The net amount of carbon dioxid of combustion is of course the same because based on equal weights of carbon. The endothermic reactions of equations (3), (7) take place within the gas producer.

A clear conception of the various steps of the process and of one embodiment of the apparatus for exploiting the same, may be had by referring to the drawing accompanying and forming a part of this specification, in which like reference characters designate the same, or similar parts in the several views.

Figure 1:
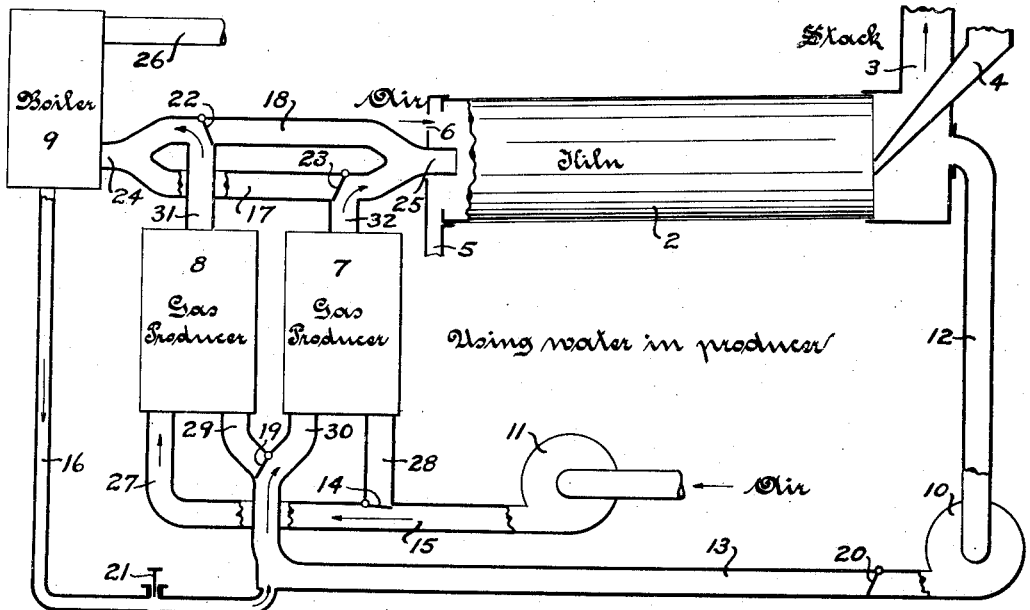
Figure 1 is a diagrammatic disclosure of the apparatus for producing carbon dioxid gas, showing the various valves controlling the flow of gases, set for utilizing water gas in the calcining zone of the kiln.
Figure 2:
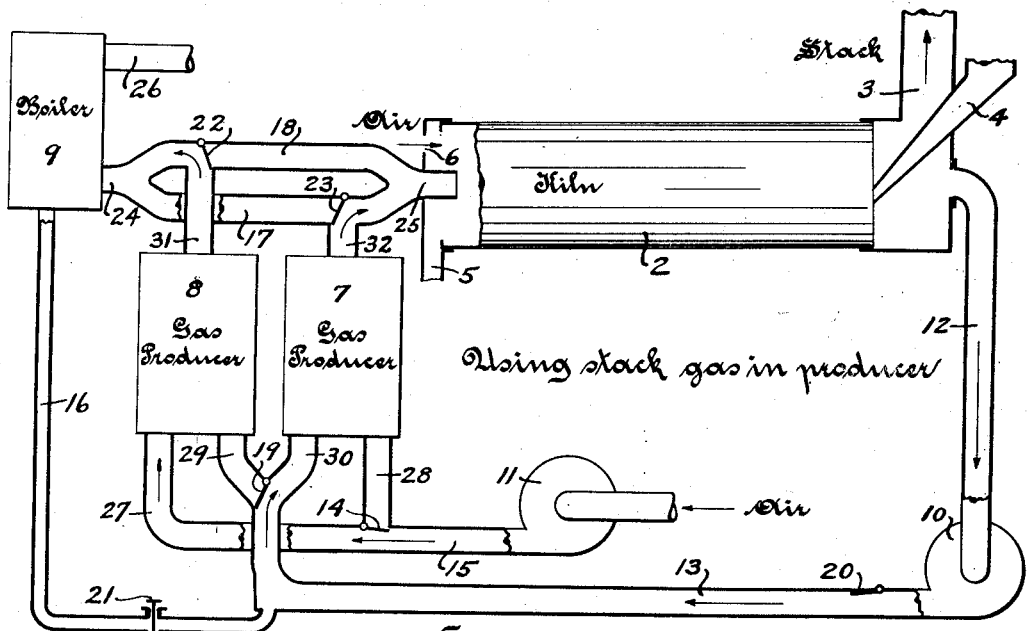
Fig. 2 is a diagrammatic disclosure of the apparatus for producing carbon dioxid gas, showing the various valves controlling the flow of gases set for utilizing stack gas from the kiln to produce carbon monoxid gas and for subsequently utilizing the carbon monoxid gas in the calcining zone of the kiln.

The apparatus comprises in general a kiln 2 of any type but shown specifically as a rotary kiln, two intermittently operable gas producers 7, 8 of the water gas type, a boiler 9, fans or blowers 10, 11 of any suitable type, and suitable conduit connections between the various elements. The rotary kiln 2 is provided with an inlet chute 4 for material to the calcined, a material discharge casing 5 having controllable air inlet openings 6 therein, and a stack forming a chamber 3 for discharging the gases generated in the kiln. The gas producers 7, 8 which are preferably of the intermittently operable type in which an exothermic agent is first utilized to bring the fuel to a point of incandescence and an endothermic agent subsequently utilized to cool the material and to produce gas, each have a pair of inlet connections 27, 28, 29, 30 and a discharge connection 31, 32. The inlet connections 27, 28 are communicable with an air supply conduit 15 connected to the blower 11 having its suction communicating with the external air. The flow of fluid from the conduit 15 to either of the inlet connections 27, 28 is controllable by means of a two-way valve 14. The inlet connections 29, 30 are communicable with either a steam connection 16 communicating with the boiler 9, or a conduit 13 communicable with the blower 10. The communication between the connections 29, 30 and the conduits 16, 13 is controllable by means of a gate valve 21 and a two-way valve 19. The discharge connections 31, 32 communicate with conduits 18, 17 respectively which conduits are communicable with the conduits 24, 25 leading to the boiler 9 and the kiln 2 respectively. Two-way valves 22, 23 control the discharge of gases from the producers 8, 7 to the boiler 9 and kiln 2 respectively.

The blower 10 in the arrangement shown, has its suction pipe 12 connected directly to the stack chamber 3. The discharge from the blower 10 is deliverable to the conduit 13, having a non-return check valve 20 therein for preventing back flow of steam to the blower 10. The boiler 9 is provided with a steam discharge conduit 26, and may be of any suitable construction adapted to be heated by gases passing therethrough.

In carrying out the first portion of the present process and utilizing the apparatus shown on the drawing, the gas producer 7 having been previously brought to a point of incandescence, the valves are initially set as in Fig. 1, the valve 21 being open and the valve 20 being closed. The valve 14 is set to cut off communication between the conduit 15 and the connection 28, thereby causing the blower 11 to deliver air to the producer 8 only. The valve 19 is set to cut off communication between the connection 29 and the conduit 13, thereby permitting the passage of steam from the boiler 9 through the conduits 16, 13 and connection 30 to the gas producer 7 only.

The gas producer 8 is being brought to an incandescent state by the admission of air from the blower 11 and the combustion of solid fuel and this air in the producer. The hot gases generated in the producer 8 are discharged through the connection 31 and conduits 18, 24, to the boiler 9 where they are burned to generate steam which is deliverable through the conduits 26, 16.

The gas producer 7 is receiving steam and is generating water gas which is delivered through the connection 32 and conduits 17, 25 to the calcining zone of the kiln 2. This water gas together with the air admitted through the openings 6 supports the combustion in the kiln and produces high heat and a gas having relatively high carbon dioxid content.

After the producer 7 has been cooled down the valves 19, 41, 22 and 23 are shifted so as to establish communication between the connection 28 and conduit 15, between the connection 29 and the conduit 13, between the connection 31 and conduit 25 and between the connection 32 and conduit 24. With the valves thus set the exothermic agent or air is being admitted to the producer 7 while the endothermic agent or steam is being admitted to the producer 8.

In utilizing carbon dioxid gases from the stack chamber 3, instead of steam from the boiler 9 as an exothermic agent in the producers 7, 8 it is necessary to close the valve 21 and to operate the fan 10, thereby opening the valve 20 and permitting the withdrawal of carbon dioxid gas from the stack chamber 3 and delivery thereof to the conduit 13. With the valves thus set, the gas producers 7, 8 are operable as before, that is, intermittently. The producers 7, 8 may first be operated to generate water gas for utilization in the kiln calcining zone, and may be subsequently adjusted to generate carbon monoxid gas for delivery to the kiln. Either method of operating the producers will permit the production of gases having higher carbon dioxid content, than with the methods heretofore employed, although the method of utilizing stack gases to generate carbon monoxid gases, is the more efficient of the two.

It should be understood that it is not desired to limit the invention to the exact steps of the process or to the details of construction of the apparatus herein shown and described for various modifications within the scope of the appended claims may occur to persons skilled in the art.

It is claimed and desired to secure by Letters Patent:

1. The process of producing gases having high carbon dioxid gas content, which comprises producing gas by combining with incandescent carbon combined oxygen under circumstances avoiding augmentation of the percentage of nitrogen in the final product, burning said gas to calcine a carbonate, and collecting the resulting gases.

2. The process of producing carbon dioxid gas, which comprises producing water gas, utilizing said water gas to calcine a carbonate and to produce carbon dioxid gas, adding carbon to said gas to produce carbon monoxid gas, and utilizing said carbon monoxid gas to calcine a carbonate.

3. The process of producing carbon dioxid by calcining a carbonate, reducing the carbon dioxid to carbon monoxid in the absence of oxygen by the use of carbon as a reducing agent, and burning the carbon monoxid to further calcine the carbonate.

4. In combination, means providing a calcining zone for material, a pair of intermittently operable gas producers, and means for interchangeably connecting said producers with said calcining zone.

In testimony whereof, the signature of the inventor is affixed hereto.

RAY C. NEWHOUSE.